US 6,525,887 B1

(12) United States Patent
Tsung-Hui

(10) Patent No.: US 6,525,887 B1
(45) Date of Patent: Feb. 25, 2003

(54) MAGNIFYING DEVICE WORN AROUND HEAD

(75) Inventor: Huang Tsung-Hui, Tai Ping (TW)

(73) Assignee: Gem Optical Co., Ltd., Taichung Hsien (TW)

( * ) Notice: Subject to any disclaimer, the term of this patent is extended or adjusted under 35 U.S.C. 154(b) by 0 days.

(21) Appl. No.: 09/984,589

(22) Filed: Oct. 30, 2001

(51) Int. Cl.⁷ .............................. G02B 27/02; G02C 1/00
(52) U.S. Cl. ......................................... 359/802; 351/41
(58) Field of Search ................................ 359/802, 803; 351/41; 2/6.3, 410, 417

(56) References Cited

U.S. PATENT DOCUMENTS

| | | | | |
|---|---|---|---|---|
| 3,945,712 A | * | 3/1976 | Crock et al. ................... | 351/41 |
| 5,715,030 A | * | 2/1998 | Quaresima ..................... | 351/44 |
| 6,087,660 A | * | 7/2000 | Morris et al. ................. | 250/330 |
| 6,116,729 A | * | 9/2000 | Huang .......................... | 351/41 |

\* cited by examiner

Primary Examiner—Ricky Mack
Assistant Examiner—Brandi Thomas
(74) Attorney, Agent, or Firm—Bacon & Thomas, PLLC

(57) ABSTRACT

A magnifying device comprises a fastening base, two elastic hoops. A magnifying lens, and a light-emitting body. The elastic hoops are fastened with the fastening base to enable the magnifying device to be worn around head with ease and speed. The magnifying lens is pivoted to the fastening base. The light-emitting body is detachably fastened with the fastening base.

4 Claims, 7 Drawing Sheets

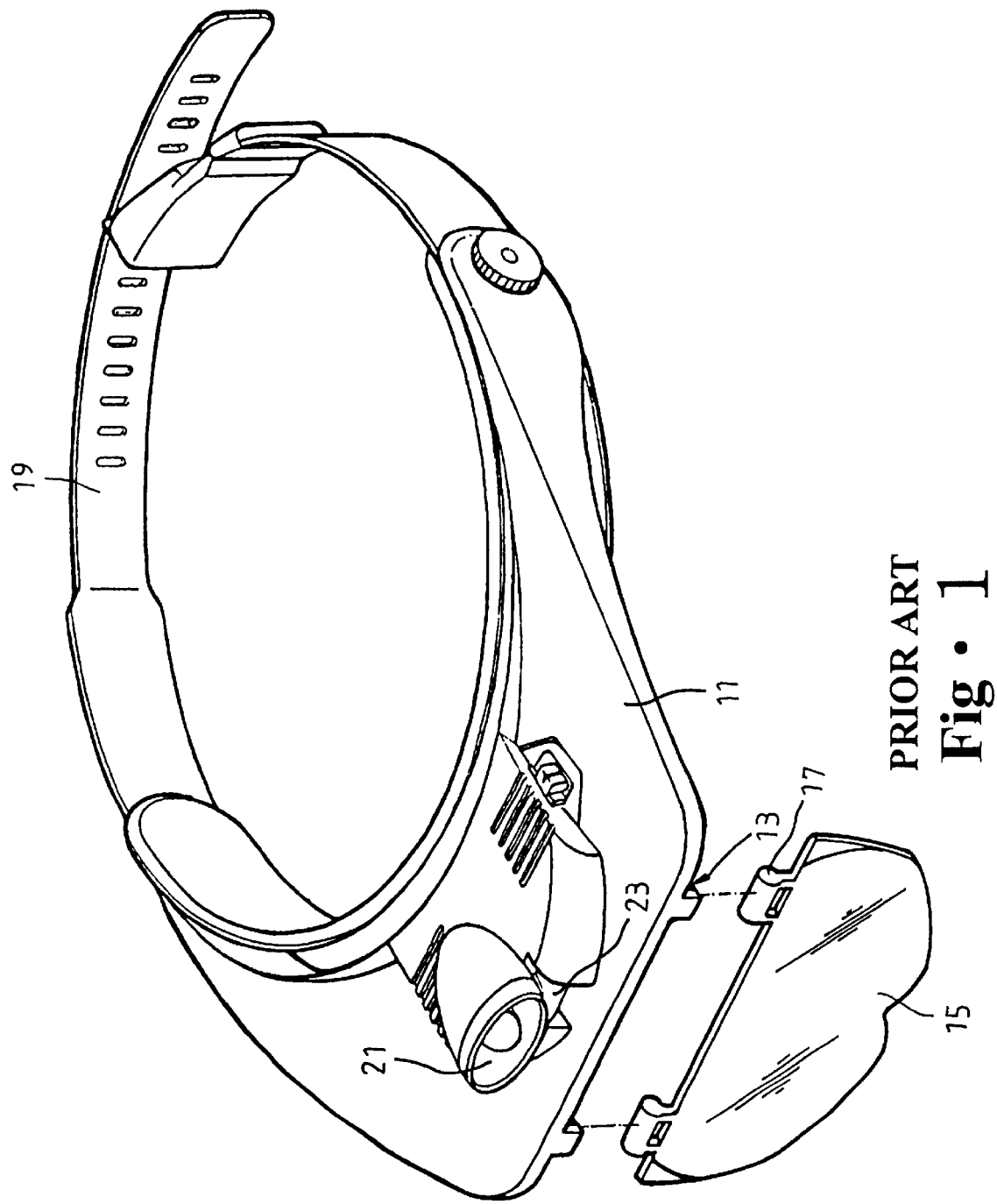
PRIOR ART
Fig • 1

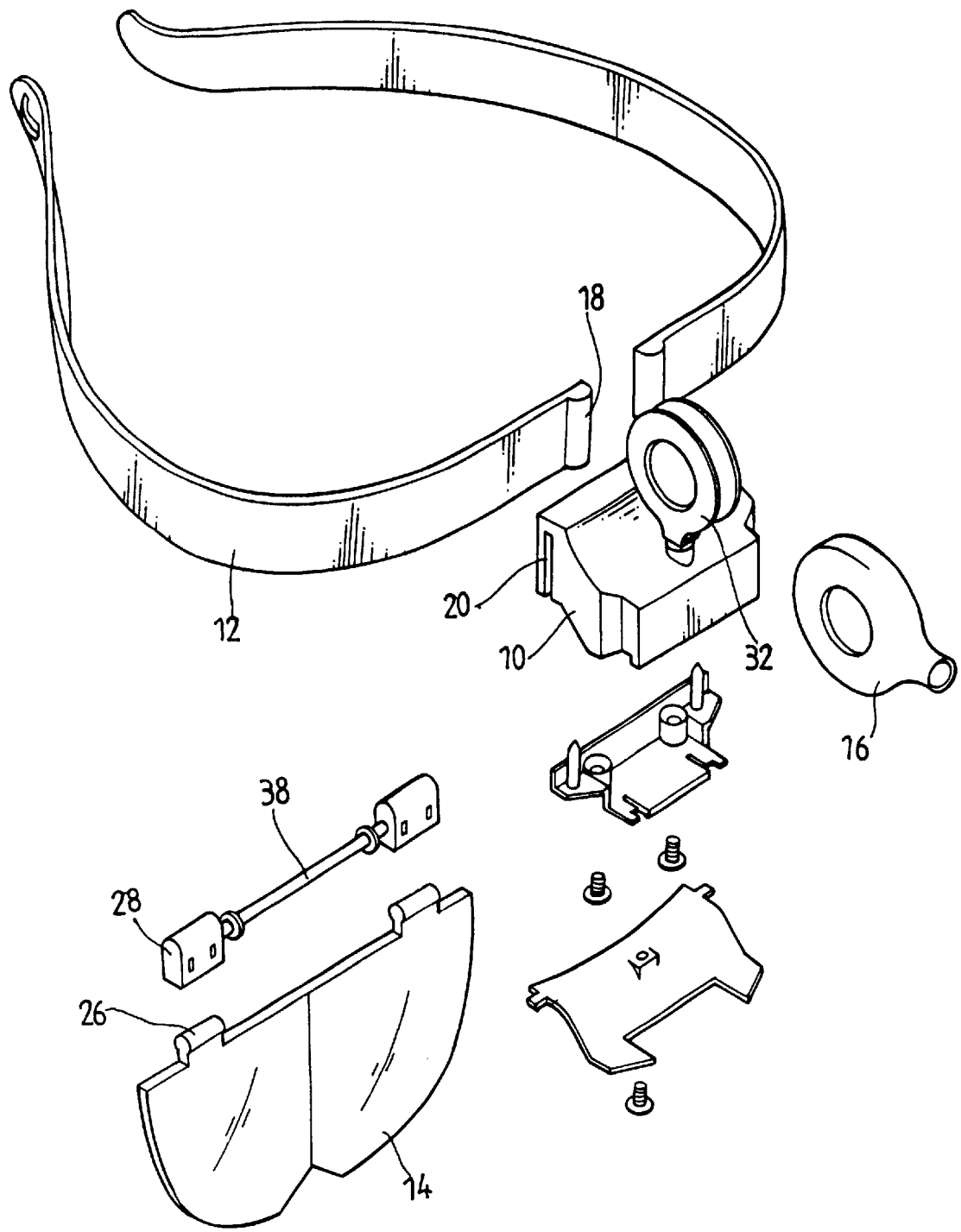
Fig · 2

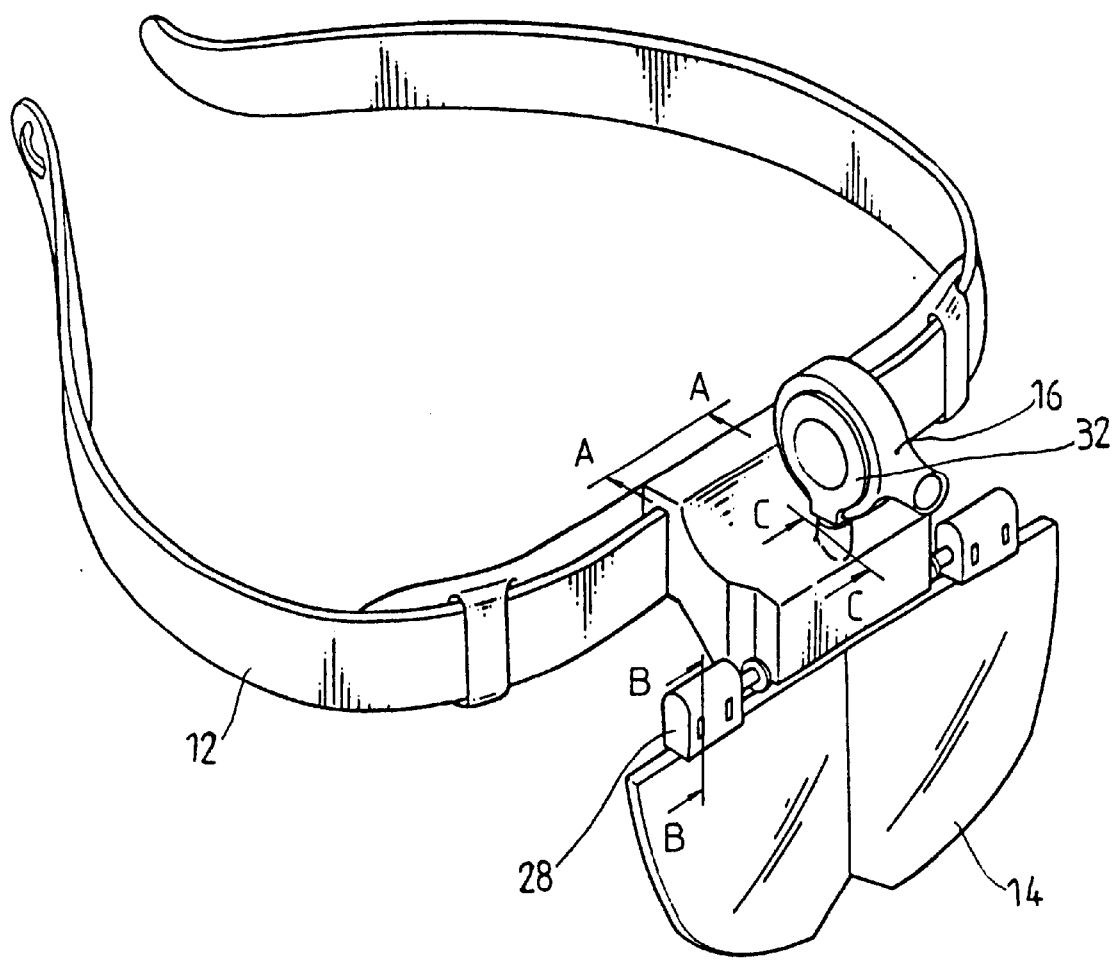
Fig · 3

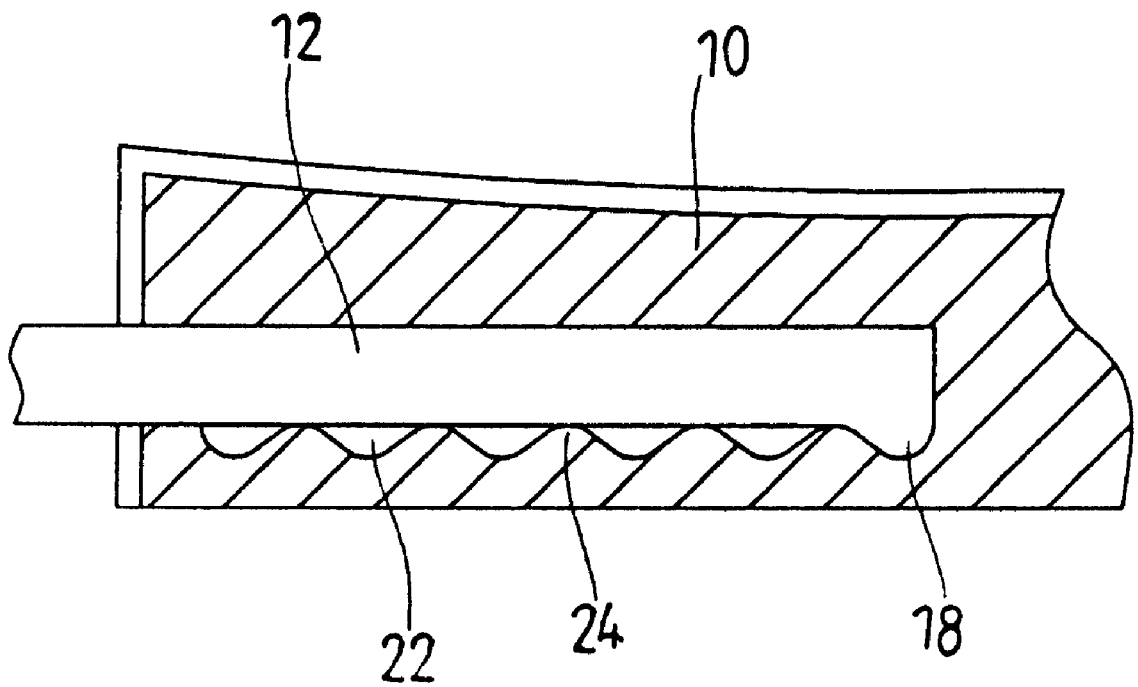
A—A
Fig • 4

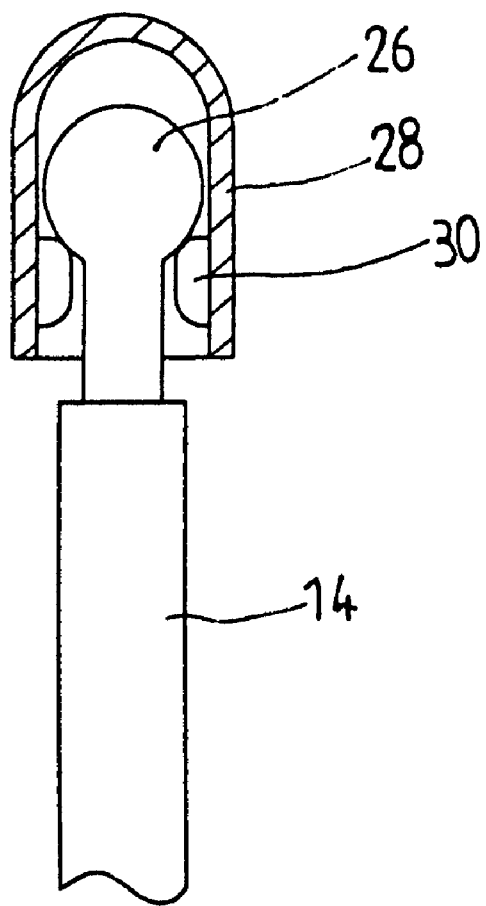
B—B
Fig · 5

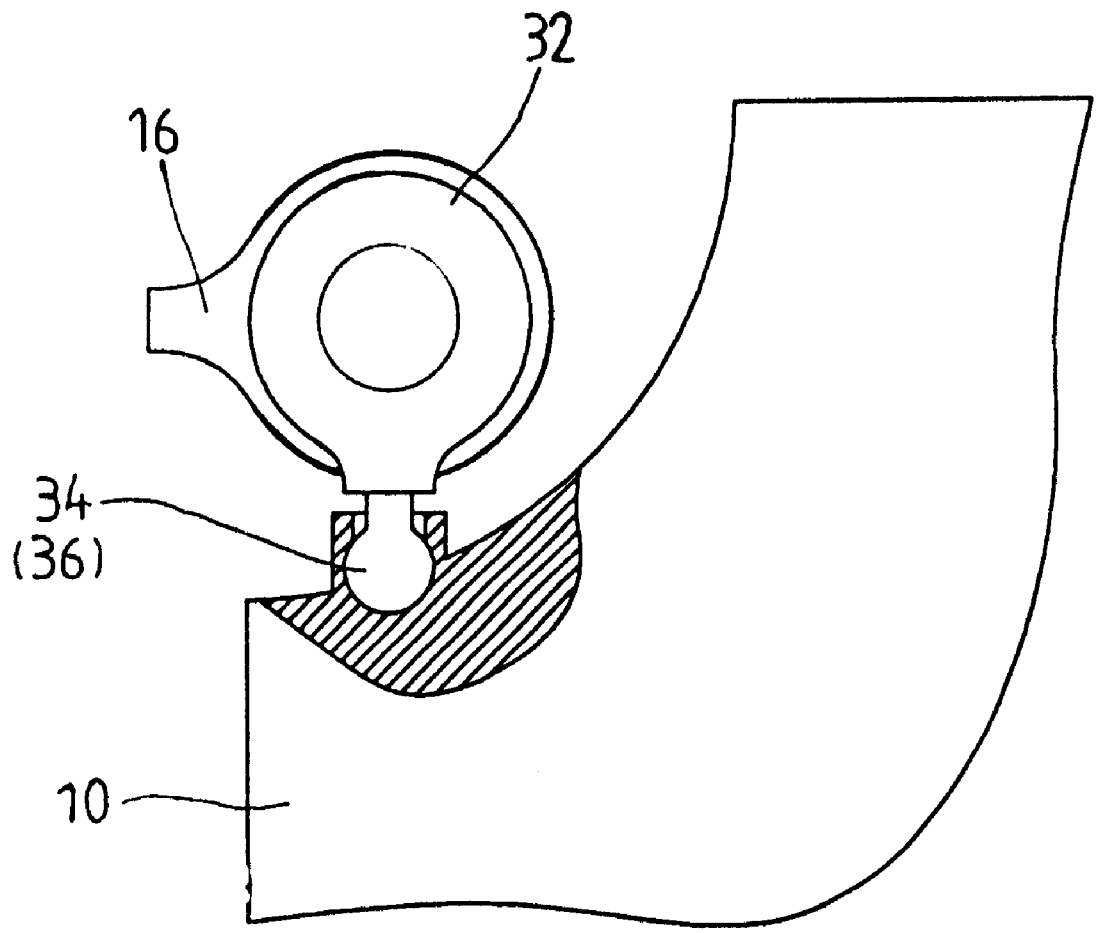
C—C
Fig • 6

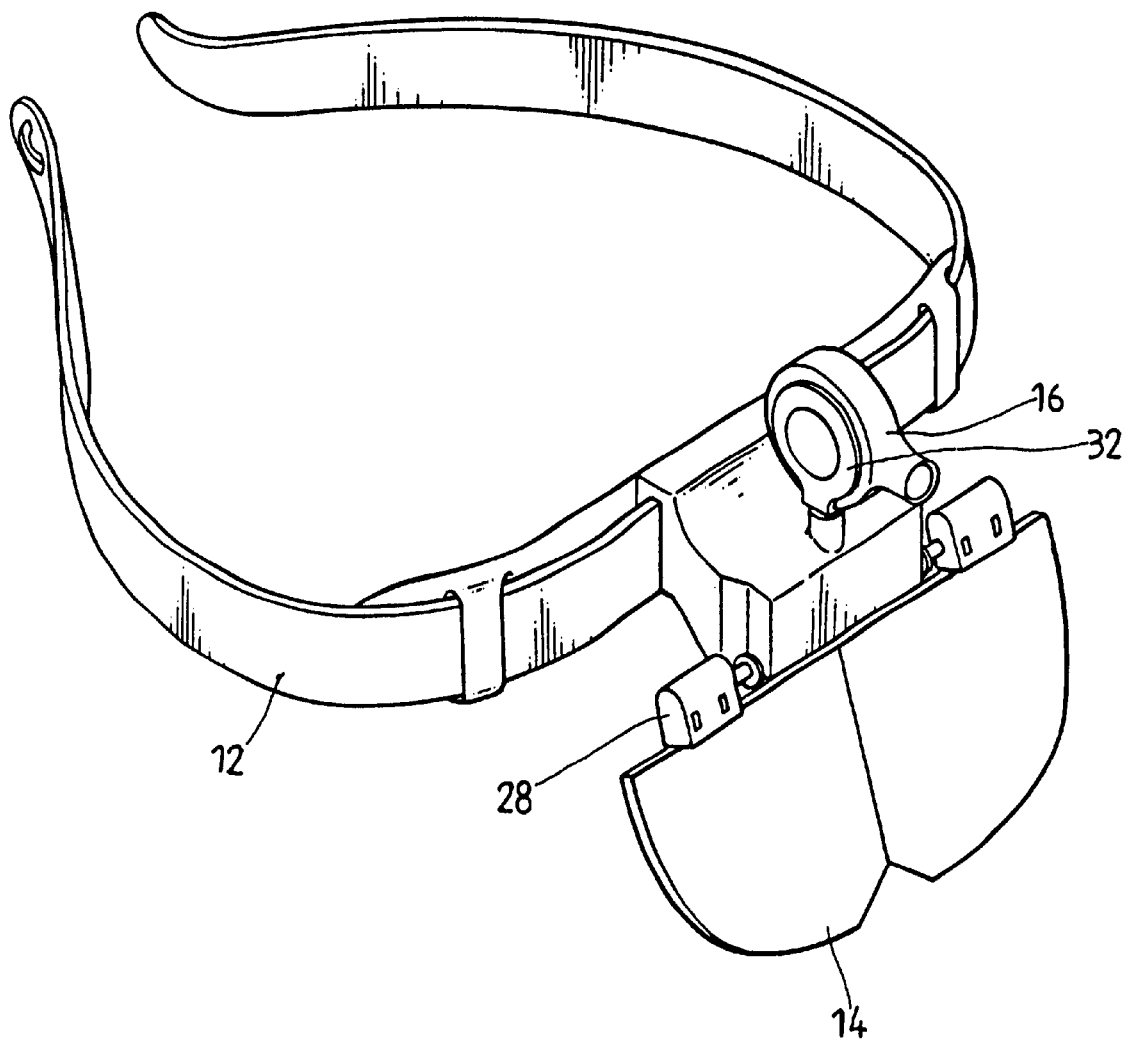
Fig • 7

MAGNIFYING DEVICE WORN AROUND HEAD

FIELD OF THE INVENTION

The present invention relates generally to an optical instrument, and more particularly to a magnifying device that is worn around head.

BACKGROUND OF THE INVENTION

As shown in FIG. 1, a magnifying device of the prior art comprises a fastening base 11 which is provided in the underside of one end thereof with two retaining seats 13 for retaining two projections 17 of a magnifying lens 15. The fastening base 11 is provided at the rear end with a headband 19 fastened therewith. The fastening seat 11 is further provided with a light-emitting body 21 which is pivoted to the fastening seat 11 by a pivoting portion 23.

Such a prior art magnifying device as described above is defective in design in that the retaining seats 13 are susceptible to fatigue after a prolonged use of the device, and that the light-emitting body 21 can not be detached to use as a flashlight, and further that the headband 19 is not user-friendly. In addition, the prior art magnifying device is provided with the A4 battery serving as power source of the light-emitting body 21. The A4 battery is relatively heavy, thereby giving an added weight to the magnifying device. It is conceivably uncomfortable to wear a heavy magnifying device around one's head. Moreover, the A4 battery is a potential source of the environmental pollutant.

SUMMARY OF THE INVENTION

The primary objective of the present invention is to provide a magnifying device which is designed to wear around one's head and is free of the deficiencies of the prior art device described above.

In keeping with the principle of the present invention, the foregoing objective of the present invention is attained by a magnifying device comprising a fastening base, two hoops, a magnifying lens, and a light-emitting body. The magnifying lens is securely pivoted to the fastening base. The light-emitting body can be detached for use as a flashlight. The present invention makes use of the lithium battery as power source of the light-emitting body. The lithium battery is relatively light in weight and greater in longevity. The present invention can be worn around one's head or removed from one's head with ease and speed.

The features and the advantages of the present invention will be more readily understood upon a thoughtful deliberation of the following detailed description of a preferred embodiment of the present invention with reference to the accompanying drawings.

BRIEF DESCRIPTION OF THE DRAWINGS

FIG. 1 shows a perspective view of a magnifying device of the prior art.

FIG. 2 shows a exploded view of the preferred embodiment of the present invention.

FIG. 3 shows a perspective view of the preferred embodiment of the present invention in combination.

FIG. 4 shows a sectional view of a portion taken along the direction indicated by a line A—A as shown in FIG. 3.

FIG. 5 shows a sectional view of a portion taken along the direction indicated by a line B—B as shown in FIG. 3.

FIG. 6 shows a sectional view of a portion taken along the direction indicated by a line C—C as shown in FIG. 3.

FIG. 7 shows a schematic view of the preferred embodiment of the present invention ready to be put into service.

DETAILED DESCRIPTION OF THE PREFERRED EMBODIMENT

As shown in FIGS. 2–7, a magnifying device of the preferred embodiment of the present invention comprises a fastening base 10, two hoops 12, a magnifying lens 14, and a light-emitting body 16.

The two hoops 12 are provided in the locating end with a projection 18. The fastening base 10 is provided in two sides with a long hole 20 having a plurality of grooves 22 and ridges 24. The locating ends of the two hoops 12 are located in the long holes 20 of the base 20 such that the projections 18 of the hoops 12 can be adjusted in location in the grooves and the ridges 24, so as to enable the elastic hoops 12 to be worn around one's head with ease and speed. The elastic hoops 12 can be easily removed from one's head by expanding slightly the hoops 12.

The magnifying lens 14 is provided in the top with a retaining projection 26. The fastening base 10 is provided in the bottom with a pivot 38 which is in turn provided at one ends thereof with a holding slot 28 having therein two retaining pieces 30. The magnifying lens 14 is retained by the fastening base 10 such that the retaining projection 26 is held by the two retaining pieces 30 and in the holding slot 28, and that the magnifying lens 14 can be swiveled on the pivot 38.

The light-emitting body 16 has a clamp seat 32 which is provided in the bottom with a spherical portion 34. The fastening base 10 is provided in the top with an arcuate 36. The light-emitting body 16 is mounted on the fastening base 10 such that the spherical portion 34 of the clamp seat 32 of the light emitting body 16 is ratably received in the arcuate recess 36 of the fastening base 10. In light of the light-emitting body 16 being detachably held by the clamp seat 32, the light-emitting body 16 can be removed to serve as a flashlight.

The light-emitting body 16 of the present invention is a light-emitting diode (LED) and is provided with the lithium battery serving as power source. The lithium battery is relatively light in weight and is not environment hazardous.

What is claimed is:

1. A magnifying device comprising:

a fastening base provided with a pivot which is in turn provided with a holding slot with two retaining pieces, said fastening base further provided with an arcuate recess, two long holes each having a plurality of grooves and ridges;

two elastic hoops provided in a locating end with a projection and fastened with said fastening base such that said locating ends of said hoops are located in said long holes of said fastening base, and that said projections of said hoops can be adjusted in location in said grooves and said ridges;

a magnifying lens provided with a retaining projection and retained by said fastening base such that said retaining projection of said magnifying lens is held by said retaining pieces of said fastening base and in sad holding slot of said fastening base, and further that said magnifying lens can be swiveled on pivot of said fastening base;

a light-emitting body provided in a clamp seat thereof with a spherical portion and mounted on said fastening base such that said spherical portion is ratably received in said arcuate recess of said fastening base; and a battery serving as a power source of said light-emitting body.

2. The magnifying device as defined in claim 1, wherein said light-emitting body is detachably held by said clamp seat.

3. The magnifying device as defined in claim 1, wherein said light-emitting body is a light-emitting diode (LED).

4. The magnifying device as defined in claim 1, wherein said battery is a lithium battery.

* * * * *